US005469226A

United States Patent [19]

David et al.

[11] Patent Number: 5,469,226
[45] Date of Patent: Nov. 21, 1995

[54] VIDEO SIGNAL PROCESSING TO DERIVE MOTION VECTORS REPRESENTING MOTION BETWEEN SUCCESSIVE FIELDS OR FRAMES

[75] Inventors: Morgan W. A. David, Farnham; James E. Burns, Basingstoke, both of England

[73] Assignee: Sony United Kingdom Limited, Staines

[21] Appl. No.: 25,741

[22] Filed: Mar. 3, 1993

[30] Foreign Application Priority Data

Mar. 31, 1992 [GB] United Kingdom ............ 9207044

[51] Int. Cl.$^6$ .................. H04N 7/24; H04N 7/30; H04N 7/32
[52] U.S. Cl. .................. 348/699; 348/409; 348/416
[58] Field of Search .................. 348/413, 416, 348/402, 441, 451, 699, 384, 390, 409; H04N 7/24, 7/30, 7/32

[56] References Cited

U.S. PATENT DOCUMENTS

| | | | |
|---|---|---|---|
| 4,998,168 | 3/1991 | Gillard | 348/451 |
| 5,005,077 | 4/1991 | Samad et al. | 358/140 |
| 5,016,101 | 5/1991 | Richards et al. | 348/699 |
| 5,027,205 | 6/1991 | Avis et al. | 348/699 |
| 5,111,294 | 5/1992 | Asai et al. | 358/136 |
| 5,151,784 | 9/1992 | Lavagetto et al. | 348/416 |
| 5,162,907 | 11/1992 | Keating et al. | 348/416 |
| 5,177,608 | 1/1993 | Ohki et al. | 348/416 |
| 5,185,819 | 2/1993 | Ng et al. | 382/56 |
| 5,299,073 | 3/1994 | Dorricott et al. | 348/441 |

*Primary Examiner*—Tommy P. Chin
*Assistant Examiner*—Vu Le
*Attorney, Agent, or Firm*—William S. Frommer; Alvin Sinderbrand

[57] ABSTRACT

A method of processing a digital video signal to derive motion vectors representing motion between successive fields or frames of the video signal comprises compares the contents of blocks of pixels in a first field or frame of the video signal with the contents of a plurality of blocks of pixels in a following field or frame, and produces for each block in the first field or frame a correlation surface representing the difference between the contents so compared in the two fields or frames. A grown correlation surface is produced for each block in the first field or frame by weighting the correlation surfaces for that block and a plurality of other blocks in an area around that block so as to accentuate features of the correlation surface for that block relative to those for the other blocks, and summing the weighted correlation surfaces. From each grown correlation surface, a motion vector is derived representing the motion of the content of the corresponding block between the two frames in dependence upon a minimum difference value represented by the grown correlation surface.

7 Claims, 7 Drawing Sheets

FIG. 2
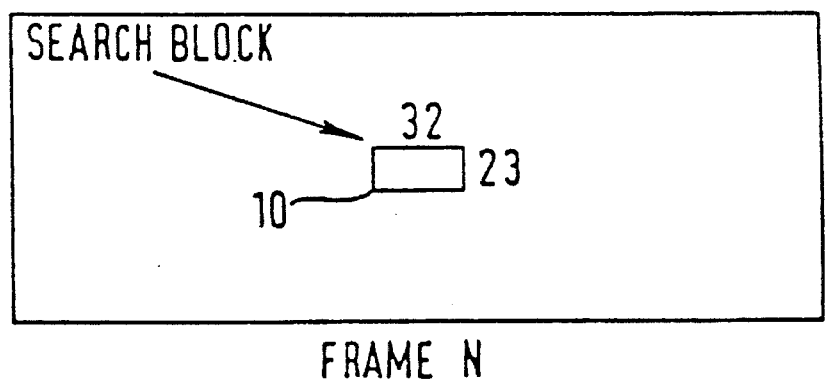
FRAME N
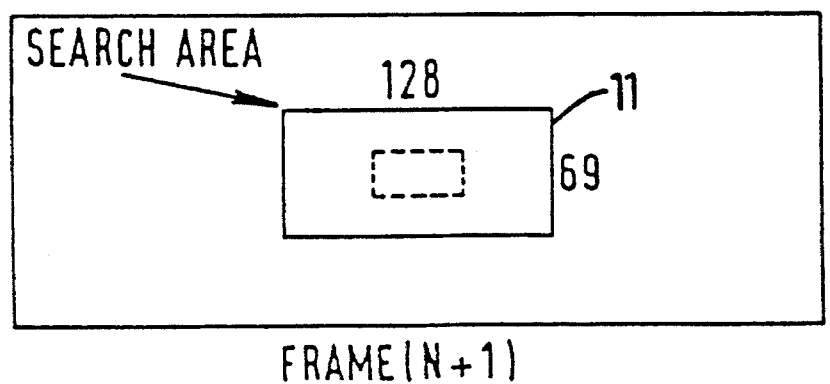
FRAME (N+1)
FIG. 3
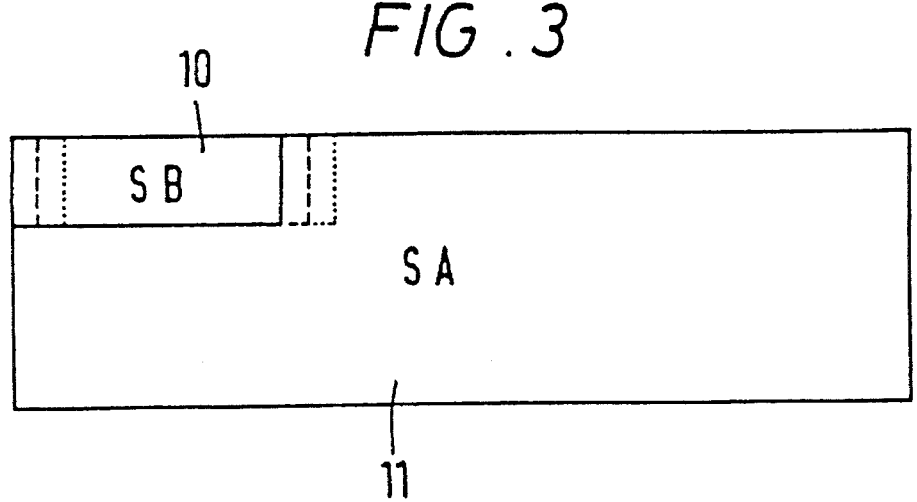

VIDEO SIGNAL PROCESSING TO DERIVE MOTION VECTORS REPRESENTING MOTION BETWEEN SUCCESSIVE FIELDS OR FRAMES

BACKGROUND OF THE INVENTION

1. Field of the Invention

This invention relates to motion dependent video signal processing, and in particular to methods of deriving motion vectors representing motion between fields or frames of a video signal.

2. Description of the Prior Art

Motion dependent video signal processing systems are known in which motion is detected in areas of the image by comparing the contents of blocks of pixels in two successive progressive scan format frames of an input video signal. The position of best correlation of the contents so compared for each block in the first frame indicates the likely motion of the content of that block between the two frames. This motion is represented by a motion vector, and motion vectors derived in this way can be used in subsequent processing stages.

An example of such a process is described in detail in UK patent applications numbers GB-A-2231752 and GB-A-2231746, the contents of these being incorporated herein by reference. GB-A-2231752 and GB-A2231746 both disclose a video standards converter in which fields or frames of a standards converted output video signal are temporally interpolated between pairs of progressive scan input frames using motion vectors derived by comparing the contents of pairs of input frames as previously mentioned. Briefly, the motion vectors are derived as follows.

The content of a block of pixels in a first progressive scan frame is compared with the content of an area in the following progressive scan frame, and a correlation surface is generated which represents the difference in the contents so compared for all possible locations of the block of pixels from the first frame in the area of the following frame. The minimum difference value represented by the correlation surface then indicates the location of best correlation. This minimum value is subjected to a threshold test to determine whether the minimum differs from the next smallest minimum by mope than a predetermined threshold. If a clear minimum, ie one satisfying the threshold test, is identified, the location of this minimum determines the value of a motion vector for the original block representing the motion of the content of that block between the two frames. If a clear minimum is not present, then the correlation surface is grown by adding together the elements of that correlation surface and correlation surfaces for neighbouring blocks, and the grown correlation surface is re-tested for a clear minimum. This process is repeated until either a good motion vector, ie a motion vector determined by a minimum which satisfies the threshold test, is located or certain growth limitations are reached, for example that the original correlation surface has been grown a predetermined number of times. In the example given, there are five levels of growth of correlation surfaces in that a grown correlation surface can be produced for a given block by summing the ungrown correlation surfaces for: a horizontal line of 3×1 blocks centered on the given block; a vertical linen of 1×3 blocks centered on the given block; a horizontal line of 5×1 blocks centered on the given block; a 3×3 array of blocks centered on the given block; and a 5×3 array of blocks centered on the given block.

In another embodiment, all possible grown correlation surfaces for a given block, within the growth limits, are produced, each of the correlation surfaces are tested for a clear minimum, and the best motion vector is then selected. In either embodiment, if no good motion vectors are located, the best available motion vector is passed on to the subsequent processing stages.

The growing of correlation surfaces serves to emphasise common minima in correlation surfaces for neighbouring blocks and thus increases the likelihood that a minimum passing the threshold test will be detected. In many cases, the motion of the contents of adjacent blocks of pixels between two frames will be the same so that the emphasis of common minima resulting from growing of correlation surfaces increases the likelihood that the motion vector derived for a particular block will be the correct one in these cases.

It has been found that using motion vectors derived from the "largest" grown correlation surfaces (ie those produced from 5×3 arrays of ungrown surfaces in the example given above) gives subjectively better results for most programme material. However, problems have been observed in some cases, for example where small objects are moving against a background. Due to the averaging effect of growing correlation surfaces, minima appearing in only one, or common to only some, of the correlation surfaces summed to form a grown correlation surface may be masked in the grown correlation surface. Thus, a motion vector derived from the grown correlation surface may not represent the true motion of a given block but may represent, for example, the most common motion among the blocks from which the grown correlation surface is derived. Thus, errors can be introduced when the image includes a small object moving against a background where the growing allows motion in the background to mask the motion of the small object.

SUMMARY OF THE INVENTION

According to one aspect of the present invention there is provided a method of processing a digital video signal to derive motion vectors representing motion between successive fields or frames of the video signal, which method comprises:

comparing the contents of blocks of pixels in a first field or frame of the video signal with the contents of a plurality of blocks of pixels in a following field or frame;

producing for each said block in the first field or frame a correlation surface representing the difference between the contents so compared in the two fields or frames;

producing a grown correlation surface for each said block in the first field or frame by weighting the correlation surfaces for that block and a plurality of other blocks in an area around that block so as to accentuate features of the correlation surface for that block relative to those for the said other blocks, and summing the weighted correlation surfaces; and deriving from each grown correlation surface a motion vector representing the motion of the content of the corresponding block between the two fields or frames in dependence upon a minimum difference value represented by the grown correlation surface.

The weighting reduces the masking effect on the motion of small objects in the grown correlation surfaces while retaining the advantages of averaging obtained through the growing. Accentuating the features of the correlation surface corresponding to a given block with respect to the other correlation surfaces used to produce the grown correlation surface for that block increases the likelihood that a correct motion vector for that block, though different from those for the surrounding blocks, will be derived from the grown correlation surface.

Only a single grown correlation surface need be produced and tested for each block, production of correlation surfaces at various stages of growth, and testing of each these, no longer being required. The extent to which correlation surfaces can be grown, ie the number of ungrown correlation surfaces that can be used to produce a grown correlation surface, is generally hardware-dependent. That is to say, the extent to which a correlation surface can be grown is limited by the amount of processing that can be done in the available time. However, it is preferred that the said grown correlation surface for a given block is produced from the correlation surface for that block and the correlation surfaces for at least the blocks immediately surrounding that block. By way of example, however, the grown correlation surface for a given block may be produced from the correlation surfaces for a 5×3 array of blocks centered on that block.

The weighting may be affected by multiplying points in each correlation surface by a weighting factor, in which case the weighting factors may decrease with horizontal and/or vertical distance of the blocks corresponding to the correlation surfaces from the block for which the grown correlation surface is to be produced.

The grown correlation surface can conveniently be produced by a digital filter, the weighting factors being determined by the filter coefficients.

According to another aspect of the invention there is provided apparatus for processing a digital video signal to derive motion vectors representing motion between successive fields or frames of the video signal, which apparatus comprises:

means for comparing the contents of blocks of pixels in a first field or frame of the video signal with the contents of a plurality of blocks of pixels in a following field or frame;

means for producing for each said block in the first field or frame a correlation surface representing the difference between the contents so compared in the two fields or frames;

means for producing a grown correlation surface for each said block in the first field or frame by weighting the correlation surfaces for that block and a plurality of other blocks in an area around that block so as to accentuate features of the correlation surface for that block relative to those for the said other blocks, and summing the weighted correlation surfaces; and means for deriving from each grown correlation surface a motion vector representing the motion of the content of the corresponding block between the two frames in dependence upon a minimum difference value represented by the grown correlation surface.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 2 and 3 illustrate diagrammatically how a correlation surface is produced;

DESCRIPTION OF THE PREFERRED EMBODIMENTS

Figure 1:
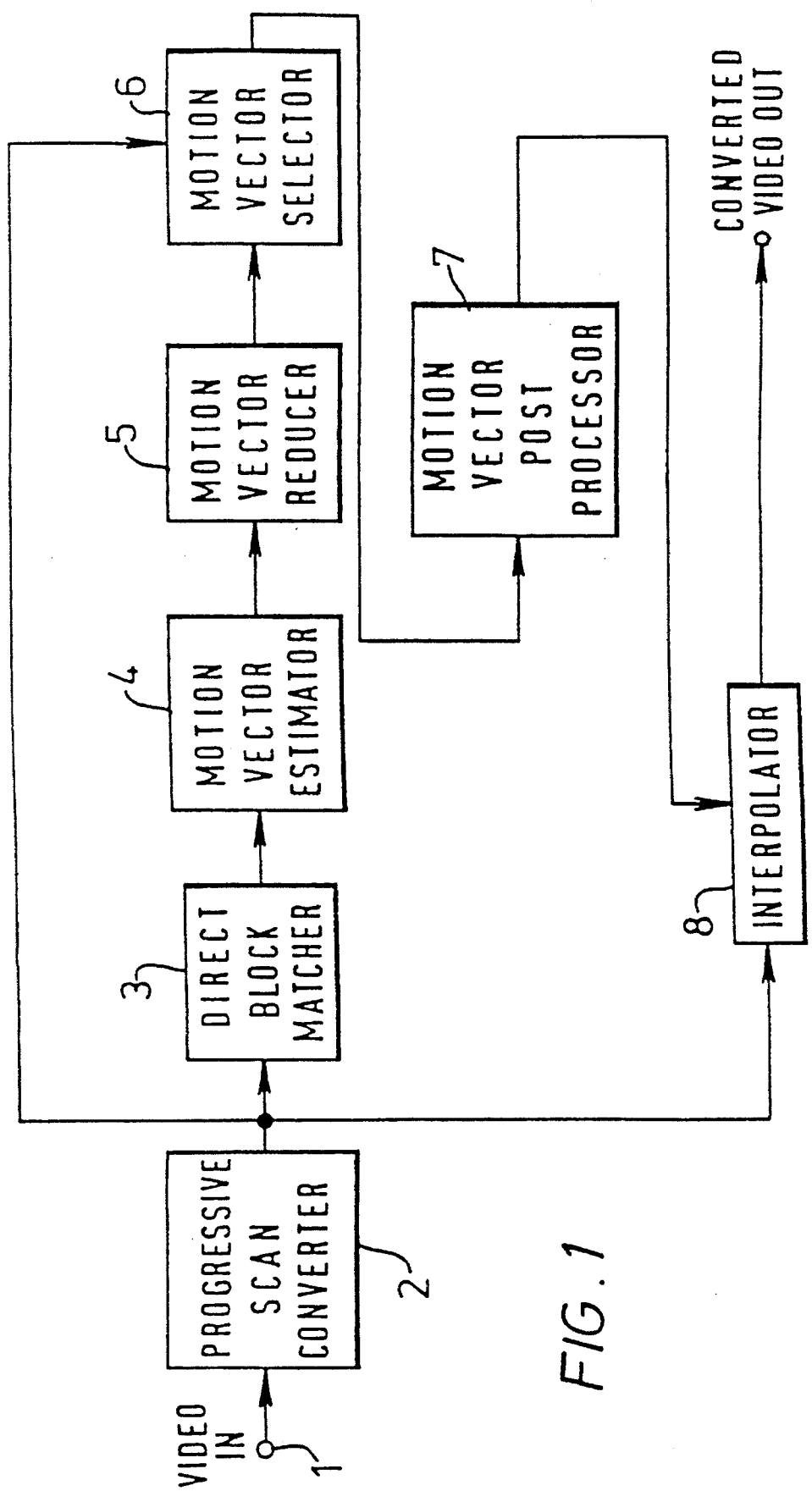
FIG. 1 is a block diagram of a motion compensated video standards converter embodying the present invention.

FIG. 1 shows a motion compensated video standard converter in which the present invention is embodied. However, it should be understood that the invention is particularly concerned with the derivation of motion vectors representing motion between fields of frames of a video signal, and the invention is not limited to application in video standards converters.

The standards converter of FIG. 1 comprises an input 1 to which a video signal to be converted is supplied. The input 1 is connected to a progressive scan converter 2 in which input video fields are converted into video frames which are supplied to a direct block matcher 3 wherein correlation surfaces are created. These correlation surfaces are then processed by a motion vector estimator 4 which derives motion vectors for blocks of pixels in the progressive scan frames. These motion vectors are supplied to a motion vector reducer 5 which assigns further motion vectors to the blocks. The motion vectors are then supplied to a motion vector selector 6 which also receives an input from the progressive scan converter 2. The motion vector selector 6 selects from the supplied motion vectors motion vectors to be associated with respective pixels of the output fields or frames to be produced. Any irregularity in the selection of motion vectors by the motion vector selector 6 is removed by a motion vector post-processor 7 from which the processed motion vectors are supplied to and control an interpolator 8 which also receives an input from the progressive scan converter 2. The interpolator 8 generates output fields/frames at the correct temporal positions with respect to the input fields in dependence upon the standards conversion being performed. The output of the interpolator 8 is thus a standards-converted and motion compensated video signal.

The operation of the standards converter is controlled by a system controller (not shown) which controls various parameters of the system. The operation of the progressive scan converter 2, motion vector reducer 5, motion vector selector 6, motion vector post-processor 7 and interpolator 8 are described in detail in GB-A-2231752 and GB-A-2231746 referred to above and incorporated herein by reference. The operation of these parts of the apparatus will therefore be described only briefly below.

The progressive scan converter 2 produces progressive scan format frames at the same rate as the input fields, the progressive scan frames being produced from the input fields by intra-field and/or inter-field interpolation. The progressive scan frames are then supplied to the direct block matcher 3 which compares the contents of blocks of pixels in two successive progressive scan frames to produce correlation surfaces as follows.

Figure 4:
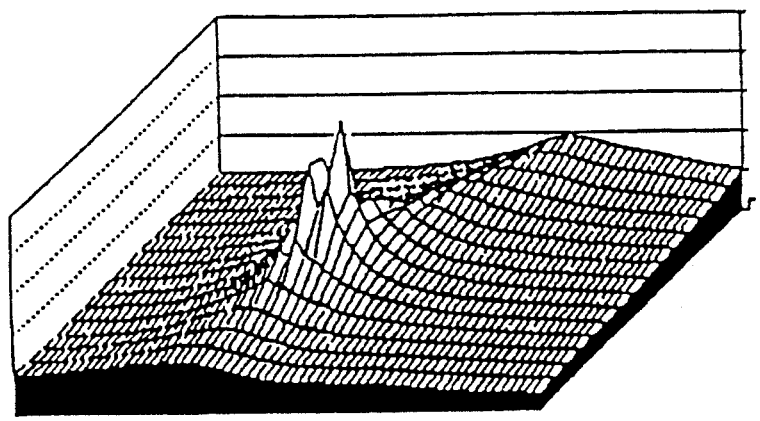
FIG. 4 shows a correlation surface.

Referring to FIG. 2, a small block of pixels 10, called a search block, of size 32 pixels by 23 lines is taken from a progressive scan frame N. Then, a larger block of pixels 11, called a search area, of size 128 pixels by 69 lines, centered on the position of the search block 10, is taken from the following progressive scan frame N+1. As shown in FIG. 3, the search block (SB) 10 is then placed in each possible position in the search area (SA) 11, and for each location the sum of the absolute difference of pixel luminance levels between the two blocks is calculated. This value is then used as the height of the correlation surface at the point at which it was derived. This value can be used in conjunction with other similarly derived values for each possible location of the search block 10 in the search area 11 to obtain a correlation surface, an example of which is shown in FIG. 4. For clarity, the correlation surface of FIG. 4 is shown inverted and the main peak in the surface as shown is in fact the minimum difference value for the correlation surface. This point is therefore the point of maximum correlation between the search block 10 and the search area 11, and hence indicates the probable motion of the content of the search block 10 between the two frames N and N+1. The displacement of the minimum on the correlation surface with respect to the origin, in this case the center of the surface, is a direct measurement, in terms of pixels per frame, of the probable motion of the content of the search block 10.

Figure 5:
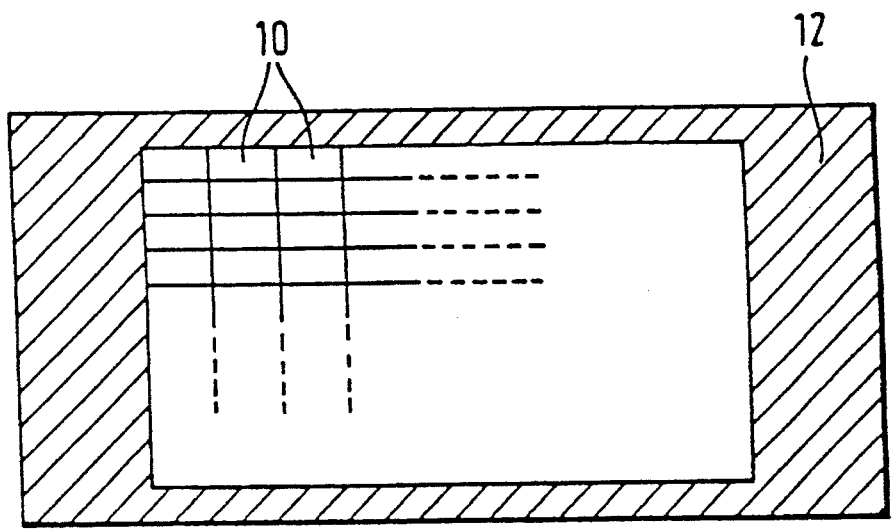
FIG. 5 shows the area of a frame in which block matching is not performed.

Correlation surfaces can be produced in this way for all search blocks in a frame apart from those in a border area 12 of the frame which is shown hatched in FIG. 5. For search blocks in the region 12, there is not enough room from which a search area can be drawn in the following frame. This problem is dealt with at a later stage by the motion vector reducer 5 (FIG. 1) which attempts to supply appropriate motion vectors to search blocks in the hatched area 12.

The correlation surfaces for respective search blocks 10 are then supplied to the motion vector estimator 4 (FIG. 1) wherein firstly grown correlation surfaces are produced and secondly the grown correlation surfaces are analysed to derive motion vectors therefrom. The grown correlation surface for a given search block is produced by adding together the elements of the original correlation surface corresponding to that block and the correlation surfaces for a number of blocks in an area around that block. The advantage of this is that, as previously described, common minima in the summed correlation surfaces are emphasised, so that where, as is often the case, the motion of adjacent search blocks is the same, the minima corresponding to the common motion vector will be emphasised, other correlation peaks being suppressed, and the likelihood of the correct motion vector being derived is increased. However, the averaging effect of direct summation of correlation surfaces can have adverse affects in some cases, for example when small objects are moving on a large background. In this case, a minimum in a correlation surface corresponding to motion of the small object may be masked in the summation process through the emphasis of more commonly occurring minima in the correlation surfaces of neighbouring blocks corresponding to motion of the background. Thus, the correlation surfaces used to produce the grown correlation surface for a given block are weighted prior to summation so as to accentuate features, and hence any minimum, in the original correlation surface corresponding to the block relative to those of the other correlation surfaces used to produce the grown correlation surface for that block. Thus, a minimum in the original correlation surface which corresponds to motion of a small object is less likely to be masked by minima in the other correlation surfaces which correspond to motion of the background.

Figure 6:
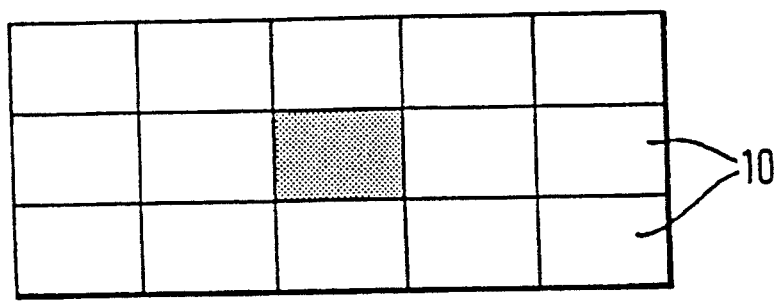
FIG. 6 illustrates blocks of pixels the correlation surfaces fop which are used in the production of a grown correlation surface.

A grown correlation surface for a given search block is produced in this embodiment by weighting and summing the correlation surfaces for a group of fifteen search blocks as shown in FIG. 6. In FIG. 6, the search block for which the grown correlation surface is to be produced is shaded. The grown correlation surface is produced by weighting and summing the correlation surfaces for an array of 5×3 search blocks 10 centered on the shaded search block. The grown correlation surfaces may be produced in the motion vector estimator 4 (FIG. 1) by the apparatus shown in FIG. 7.

Figure 7:
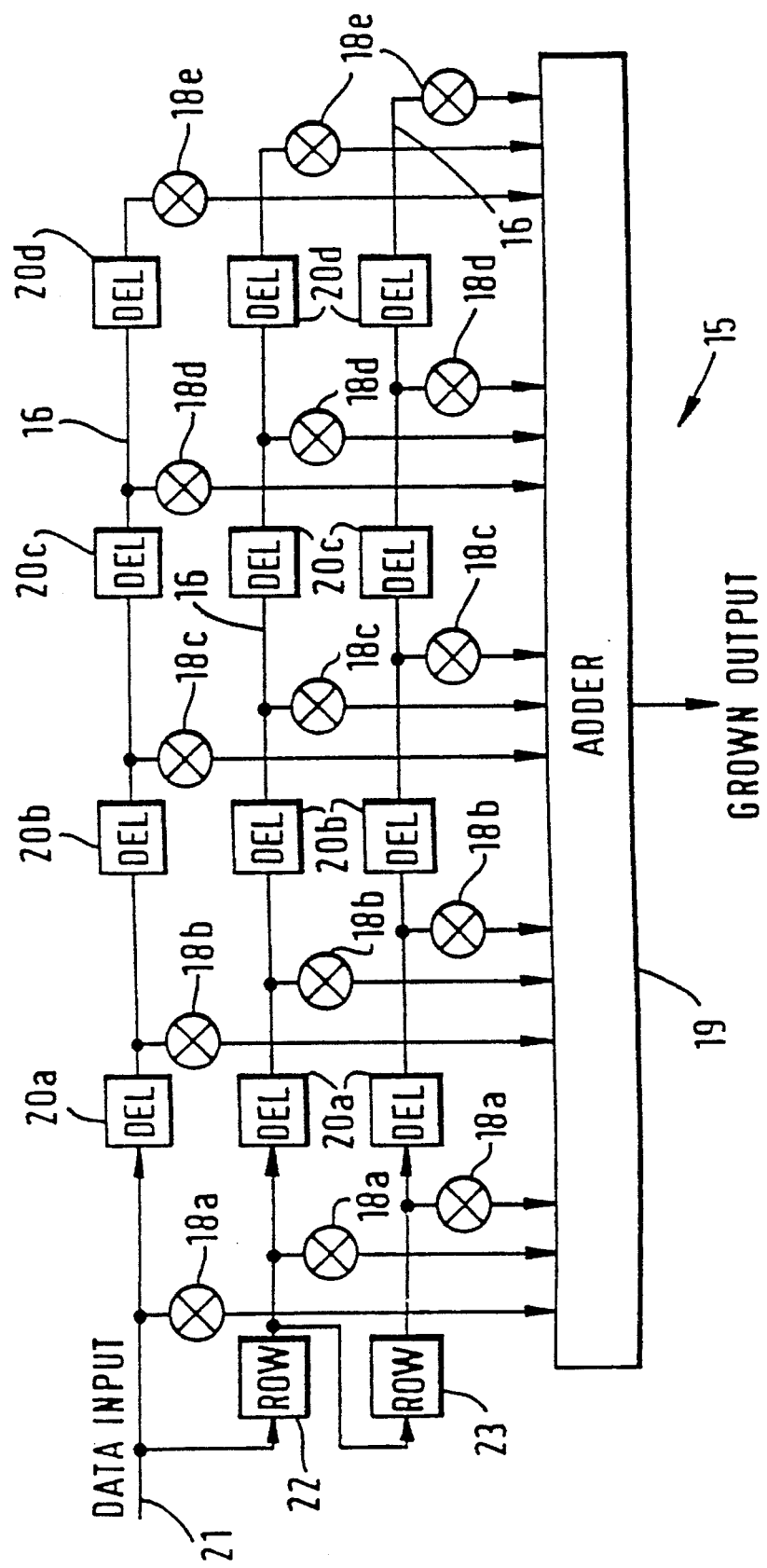
FIG. 7 shows a two-dimensional array filter fop the production of grown correlation surfaces.

FIG. 7 shows a two-dimensional array filter 15 comprising three parallel delay lines 16 each having five taps which are connected to respective multipliers 18a to 18e. The output of each multiplier forms an input to an adder 19. Each delay line 16 includes four correlation surface delays (DELs) 20a to 20d each capable of storing the data elements representing one complete correlation surface. An input 21 of the filter 15 is connected to the first correlation surface delay 20a of the upper delay line 16 and also a row delay (ROW) 22 at the start of the middle delay line 16 in the figure. The output of the row delay 22 is connected to a further row delay 23 at the start of the lower delay line 16 in the figure. Each row delay 22, 23 is capable of storing the data elements of a complete row of correlation surfaces. (The correlation surfaces produced for a frame of search blocks 10 can be considered to form an array of correlation surfaces corresponding to the array of search blocks for which they have been generated. Thus, a "row" of correlation surfaces consists of the correlation surfaces for a row of search blocks in a given frame.)

Figure 8:
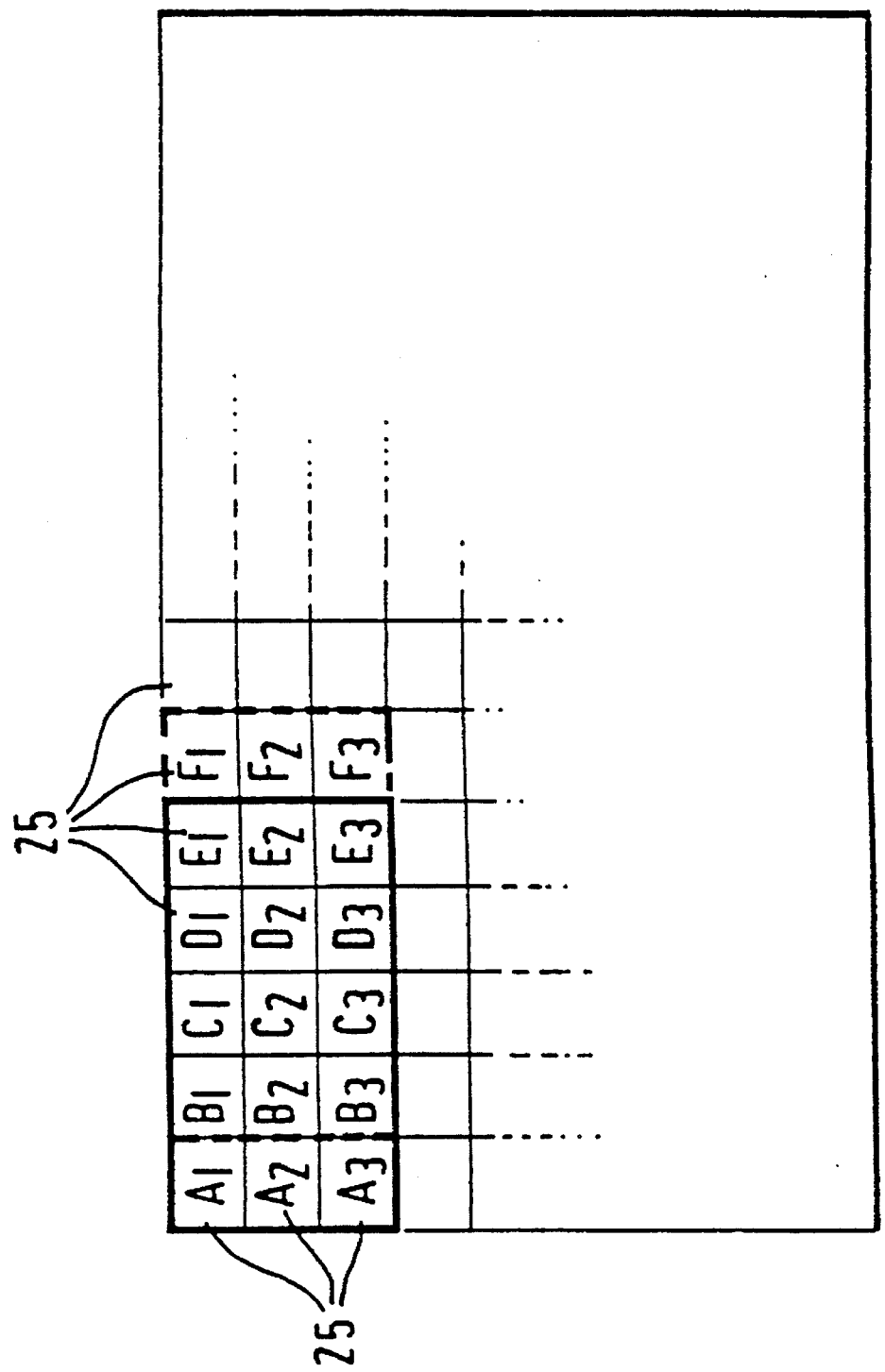
FIG. 8 shows schematically an array of correlation surfaces and is referred to in explaining the operation of the filter of FIG. 7.

The operation of the filter 15 will be described with reference to FIG. 8. FIG. 8 shows schematically an array of correlation surfaces 25 corresponding to the array of search blocks in a frame for which the correlation surfaces have been generated. Each correlation surface 25 can be considered as an array of data elements each representing an absolute pixel luminance difference value as described earlier. Each correlation surface 25 consists of 96×46 of these elements, ie a total of 4416 data elements. The array of correlation surfaces 25 shown in FIG. 8 consists of 60×41 correlation surfaces, ie 2460 correlation surfaces in total.

In operation of the filter 15, the array of data elements forming each correlation surface 25 is "twisted" to produce a continuous stream of data elements. The data elements are then clocked into the input 21 of the filter 15 for each correlation surface 25 in turn, starting with the correlation surface $A_1$ in the top left hand corner of the array shown in FIG. 8. This is followed by correlation surface $B_1$, and then correlation surface $C_1$ and so on along the top row of the array. The next row is then clocked in, again starting with the correlation surface at the right hand side of the array, ie the surface $A_2$. As the elements of correlation surface $A_1$ are clocked in to the input 21, these will be stored in the first correlation surface (CS) delay 20a in the top delay line 16 of the filter 15, and also in the row delay 22 at the beginning of the second delay line 16. As the elements of the second correlation surface $B_1$ are clocked in, these are clocked in to the first CS delay 20a in the upper delay line 16 and the elements of the correlation surface $A_1$ are clocked out of this delay and into the next delay 20b in the delay line 16. At the same time, the elements of the correlation surface $B_1$ are clocked into the row delay 22. This process continues until the complete row of correlation surfaces has been clocked in and is stored in the row delay 22. As the correlation surface data is clocked along the upper delay line 16, this is also supplied via the taps to the multipliers 18 and on to the adder 19. However, we are not at this stage interested in the output of the adder 19.

As the second line of correlation surfaces in the array of FIG. 8 is clocked into the filter 15, these pass along the upper delay line 16. At the same time, the first row of correlation surfaces stored in the row delay 22 is clocked along the middle delay line 16 and also into the row delay 23 at the start of the lower delay line 16. Similarly, as the third row of correlation surfaces is clocked into the filter, these will pass along the upper delay line 16, the second row of correlation surfaces stored in the row delay 22 will be clocked along the middle delay line 16, and the first row of correlation surfaces then stored in the row delay 23 will be clocked along the lower delay line 16.

Just before the correlation surface $E_3$ has been clocked into the filter, the correlation surfaces $A_3$, $B_3$, $C_3$ and $D_3$ will be stored in the CS delays 20d, 20c, 20b and 29a respectively of the upper delay line 16. Similarly, the surfaces $A_2$, $B_2$, $C_2$ and $D_2$ will be stored in the CS delays 20d, 20c, 20b and 29a respectively of the middle delay line 16. The surface $E_2$ is the next surface to be output by the row delay 22. Likewise, the correlation surfaces $A_1$, $B_1$, $C_1$, $D_1$ and $E_1$ are stored in the CS delays 20d, 20c, 20b and 29a and the row delay 23 respectively of the lower delay line 16.

The 5×3 array of surfaces $A_1$ to $E_1$, $A_2$ to $E_2$, $A_3$ to $E_3$ bounded by the solid line in FIG. 8 are to be weighted and summed to produce a grown correlation surface for the search block corresponding to the original ungrown correlation surface $C_2$. This is achieved as the correlation surface $E_3$ is clocked into the input 21 of the filter 15. As the first element of the correlation surface $E_3$ is clocked into the filter, it is multiplied by a weighting factor by the multiplier 18a connected to the upper delay line 16 and applied as an input to the adder 19. Simultaneously, the corresponding data elements of each of the other Fourteen correlation surfaces in the 5×3 array are output to a respective multiplier 18, multiplied by a respective weighting factor, and applied at one of the other inputs to the adder 19. The output of the adder 19 is thus a weighted sum of these corresponding data elements, and this is taken as the first data element of the grown correlation surface. This process is repeated for successive corresponding elements of the fifteen correlation surfaces $A_1$ to $E_3$ as successive elements of the surface $E_3$ are clocked into the filter. After the last element of the surface $E_3$ has been clocked in, one complete grown correlation surface has been output by the adder 19.

As the next correlation surface $F_3$ is clocked into the filter 15, a new grown correlation surface is output by the adder 19 representing the weighted sum of the correlation surfaces in the 5×3 array $B_1$ to $F_1$, $B_2$ to $F_2$ and $B_3$ to $F_3$ indicated by the broken lines in FIG. 8. This grown correlation surface is for the search block corresponding to the ungrown correlation surface $D_2$. Thus, as the filtering process continues, the 5×3 array of correlation surfaces used to produce the grown correlation surface moves successively to the right in FIG. 8, the grown correlation surfaces so produced corresponding to successive search blocks in a row of search blocks.

When the 5×3 array reaches the right hand edge of the full array shown in FIG. 8, the fourth row of correlation surfaces is supplied to the input 21. The output of the adder 19 is then ignored until the fifth correlation surface in this row is clocked in. As the elements of this correlation surface are supplied to the input, the adder 19 outputs the corresponding elements of a grown correlation surface for the search block corresponding to the ungrown correlation surface $C_3$, and the above process is repeated for the second, third and fourth rows of correlation surfaces in FIG. 8.

As previously explained, each grown correlation surfaces corresponds to the search block for which the ungrown correlation surface at the center of the 5×3 array was originally derived. Thus, grown correlation surfaces cannot be produced for search blocks with original ungrown correlation surfaces in a border region of the array of FIG. 8. Search blocks corresponding to these ungrown correlation surfaces are assigned the grown correlation surface (or the motion vector derived therefrom) for the nearest search block to that block.

Thus, the effect of the filter 15 is to multiply the elements of each correlation surface in a 5×3 array by a corresponding weighting factor and then to sum the weighted correlation surfaces. The effect of the weighting is to emphasise the features of the original ungrown correlation surface corresponding to a given block relative to those of the other fourteen correlation surfaces which are used to produce the grown correlation surface for that block. Thus, the greatest weighting factor is applied to the central ungrown correlation surface in the 5×3 array, the weighting factors decreasing for the other surfaces in the array the further these are horizontally and vertically from the central surface. The weighting factors are essentially the coefficients of the filter 15 of FIG. 7. Suitable values for these coefficients can be derived in accordance with known finite impulse response filter design techniques. For example, a known filter design which gives a good approximation to a "brick wall" filter (ie, an ideal low-pass filter) may be taken as a starting point, and the known techniques of "windowing" and the Remez Exchange Algorithm can be applied to calculate appropriate coefficient values for the arrangement of FIG. 7. Any noise in the input to the filter can thereby be substantially reduced in the output. By way of example, suitable coefficient values for the filter 15 of FIG. 7 might be 0.0703, 0.3359, 0.5313, 0.3359, 0.0703 for the multipliers 18a to 18e respectively of both the upper and lower delay lines in FIG. 7; and 0.1318, 0.6328, 1.000, 0.6328, 0.1318 for the multiplier 18a to 18e respectively of the middle delay line. The system can be tested with different sets of coefficients derived in this way and those with which the best results are achieved (which may vary for different types of programme material) can be stored within the system. For example, useful coefficient values may be stored in a PROM for selection by the system controller depending upon the programme material being processed. Alternatively, or in addition, the coefficient values may be entered by a user via a keyboard of the system controller to allow for experimentation with coefficient values.

The filter coefficients are made symmetric allowing a reduction in the number of stored coefficients needed. The lower bits of each multiplication performed by the multipliers 18 may be dropped where necessary to prevent any growth in the number of bits required to represent a point magnitude in a grown correlation surface as compared with an ungrown correlation surface.

Figure 9:
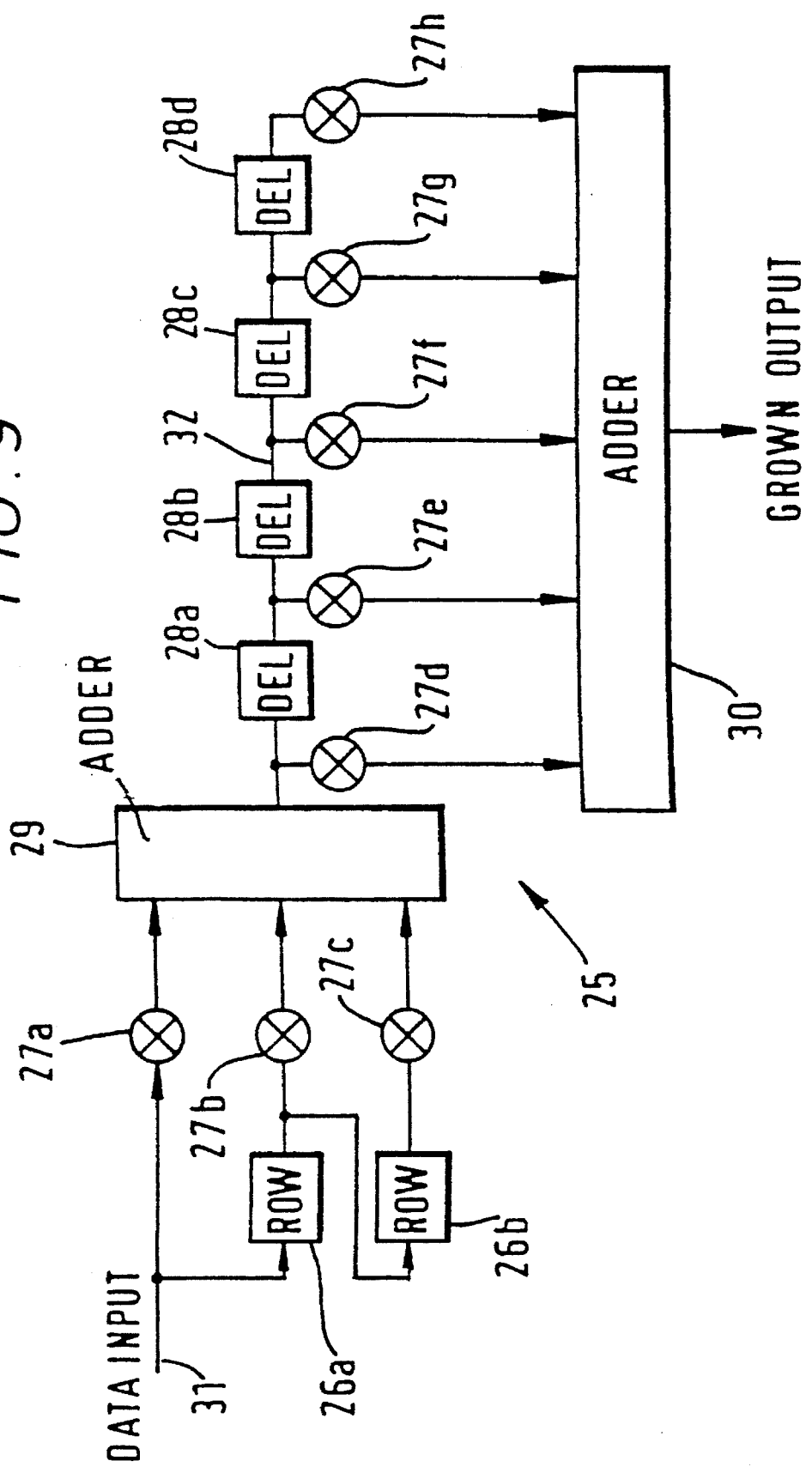
FIG. 9 shows an alternative filter fop the production of grown correlation surfaces.

As an alternative to the filter 15 of FIG. 8, the two-stage filter 25 of FIG. 9 may be used to produce the grown correlation surfaces. The filter 25 consists of two row delays 26a and 26b, eight multipliers 27a to 27h, four CS delays 28a to 28d, and two adders 29 and 30, all connected as shown. The filter 25 performs the same overall function as the filter 15 described above with reference to FIGS. 7 and 8. Thus, as before, the correlation surfaces are clocked into an input 31 of the filter 25 on a row by row basis starting with the top left correlation surface $A_1$ in the array of FIG. 8. When the first two rows of correlation surfaces have been clocked in, the first row is stored in the row delay 26b and the second row is stored in the row delay 26a. As the third row is clocked in, the multipliers 27a, 27b and 27c multiply the elements of the correlation surfaces in the corresponding row by a respective weighting factor, and the weighted elements are then summed by the adder 29 and output along the delay line 32. Just before the correlation surface $E_3$ is clocked into the input 31, the CS delay 28d holds the weighted sum of the surfaces $A_1, A_2, A_3$, the CS delay 28c holds the weighted sum of the surfaces $B_1, B_2, B_3$, and the CS delays 28b and 28a hold the weighted sums of the surfaces $C_1, C_2, C_3$ and $D_1, D_2, D_3$ respectively. Thus, as the correlation surface $E_3$ is clocked in, the weighted sums stored in the CS delays 28a to 28d are output to the multipliers 27e to 27h respectively, and the output of the adder 29 (is the weighted sum of the surfaces $E_1$ to $E_3$) is output to the multiplier 27d. The outputs of the multipliers 27d to 27h are applied as inputs to the adder 30. Thus, the adder 30 outputs successive elements of the grown correlation surface as the elements of $E_3$ are applied at the input, the resulting grown correlation surface being a weighted sum of the fifteen correlation surfaces $A_1$ to $E_3$. Again, the weighting factors or filter coefficients are selected as previously described such that the overall effect of the weighting is to emphasise the features of the central ungrown correlation surface (in this case $C_2$) with respect to those of the other fourteen correlation surfaces used to produce the grown correlation surface.

Once the grown correlation surfaces have been produced, it is then necessary to derive motion vectors from the surfaces. The motion vector to be derived from each grown correlation surface is given by the coordinates of the minimum point of the correlation surface with respect to the origin of the surface (in this case the center of the surface). This minimum value is rested to determine whether it represents a clear minimum, ie one which differs from the next smallest minimum of the surface by more than a predetermined threshold. The next smallest minimum is prevented from originating within a certain area of the minimum under test. The full circuit for locating and testing the minimum and identifying the coordinates of the minimum to give the motion vector is described in detail in GB-A-2231746 referred to above. However, the testing of minima will be described briefly with reference to FIG. 10 which shows schematically part of a grown correlation surface.

Figure 10B:
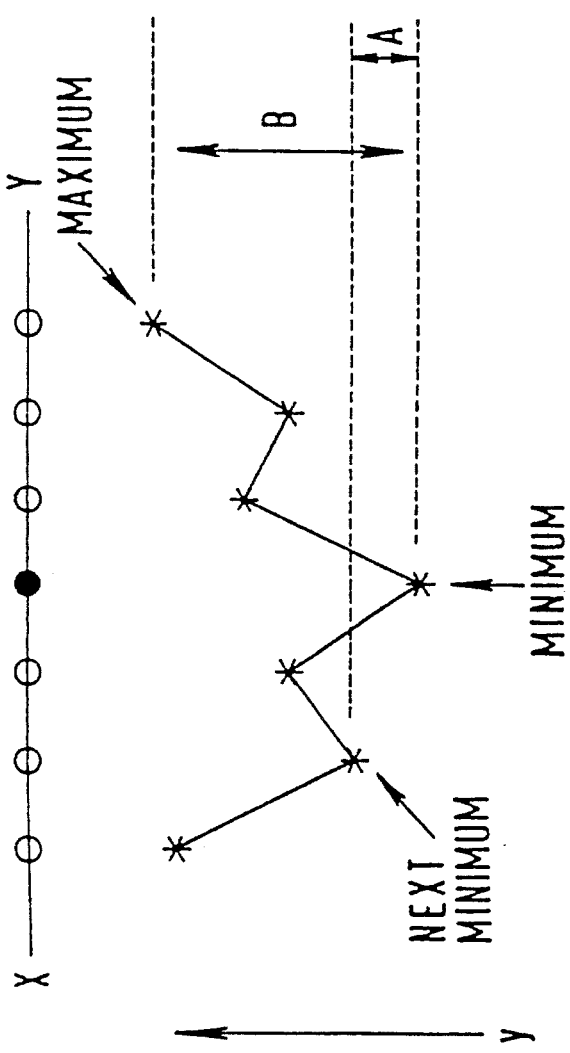
FIGS. 10a and 10b are schematic plan and cross-sectional views respectively of part of a grown correlation surface.
Figure 10A:
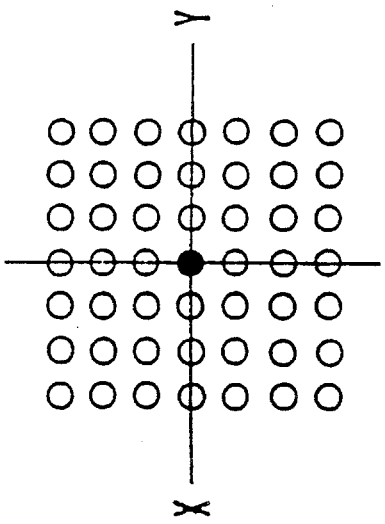

FIG. 10a is a plan of part of the grown surface showing an array of points therein. In FIG. 10b, a line X-Y of these points has been extracted from the array and below this the magnitudes of the difference value represented by the points in the line X-Y are marked relative to a y-axis. This therefore represents schematically a cross-section through part of a correlation surface. The minimum difference value represented by the grown correlation surface is marked as the minimum. Also shown is the "next minimum" which is the minimum point on the correlation surface which lies outside a certain area surrounding the actual minimum of the correlation surface. Also shown is the maximum which is defined as being the point on the correlation surface whose magnitude is greater than the magnitude of any other point on the correlation surface. Once the minimum, next minimum and maximum values have been determined, the minimum is tested to see whether it passes the threshold test. In order to pass the threshold test, the absolute difference A between the magnitude of the minimum and the magnitude of the next minimum must be greater than a given threshold percentage of the absolute difference B between the magnitude of the minimum and the magnitude of the maximum. The threshold percentage value may be set by a user via the system controller referred to above, or may be set automatically within the system. By way of example, the threshold value may be 5%.

If the minimum satisfies the threshold test, ie the minimum is a clear minimum, then the motion vector represented by the coordinates of the minimum is considered to be a good motion vector. If the minimum fails the threshold test, then the motion vector is flagged as a failed motion vector. The motion vectors derived for respective search blocks in this way are then supplied by the motion vector estimator 4 in FIG. 1 to the motion vector reducer 5.

The motion vector reducer 5 applies a vector reduction algorithm to assign additional motion vectors to each block which vectors are passed to the motion vector selector 6, in each case along with any good motion vector derived by the motion vector estimator for that block, to ensure that the selector is not forced into selection of an inappropriate motion vector. The additional motion vectors are assigned to each block in the motion vector reducer 5 until up to a predetermined number of unique motion vectors are associated with each block as is described in detail in GB-A-2231752 referred to above.

The motion vector selector 6 uses the motion vectors supplied by the motion vector reducer 5 and the two progressive scan frames of the original pair on which block matching was performed (which are supplied by the progressive scan converter 2) to select a motion vector to be associated with each pixel of an output field/frame to be interpolated. The motion vector post-processor 7 removes any irregularities in the motion vector selected by the motion vector selector 6 and then supplies the processed motion vectors for the output pixels to the interpolator 8. For each output pixel, the interpolator 8 uses the motion vector supplied for that output pixel, and the correct temporal position along the motion vector for output pixels in that field/frame, to determine which parts of the frames of the progressive scan frame pair (supplied by the progressive scan converter 2) should be combined, with appropriate weighting, to produce the output pixel. The correct temporal position for output pixels depends upon the particular frame rate conversion being performed and will vary for different output fields/frames. The temporal position for each output field/frame is determined by the system controller which controls the interpolator 8 accordingly. Thus, the interpolator 8 interpolates along the direction of movement in dependence upon the motion vectors to produce a motion compensated and standards converted output video signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing a digital video signal to derive motion vectors representing motion between successive fields or frames of the video signal, comprising the steps of:

calculating a difference between the contents of each of a plurality of first regions in a first field or frame and the contents of a corresponding one of a plurality of second regions in a succeeding field or frame, each said first region comprising a block of pixels and each said second region comprising a plurality of contiguous blocks of pixels, said block of said first region and one of said blocks of said second region representing a common block;

producing for each said first region in the first field or frame a first correlation surface representing said difference;

weighting the first correlation surfaces of a respective one of said first regions and of a plurality of first regions adjoining said respective first region, the first correlation surface of said respective first region having the greatest weighting to accentuate features of the first correlation surface of said respective first region relative to those of the adjoining first regions, all the points within a given correlation surface being weighted equally;

summing the weighted first correlation surfaces to generate a grown correlation surface; and deriving from each grown correlation surface a motion vector representing the motion of the content of said common block as a function of a minimum value within the grown correlation surface.

2. A method as claimed in claim 1, wherein the weighting of a respective one of the first correlation surfaces of said respective first region and of the adjoining first regions is effected by multiplying all points in the respective first correlation surface by a respective weighting factor.

3. A method as claimed in claim 1, wherein the adjoining first regions are the first regions immediately surrounding said respective first region.

4. A method as claimed in claim 1, wherein the grown correlation surface for said respective block is produced from the first correlation surfaces of a 5×3 array of first regions centered on said respective first region.

5. A method as claimed in claim 1, wherein the grown correlation surface is generated by a digital filter.

6. Apparatus for processing a digital video signal to derive motion vectors representing motion between successive fields or frames of the video signal, comprising:

means for calculating a difference between the contents of each of a plurality of first regions in a first field or frame and the contents of a corresponding one of a plurality of second regions in a succeeding field or frame, each said first region comprising a block of pixels and each said second region comprising a plurality of contiguous blocks of pixels, said block of said first region and one of said blocks of said second region representing a common block and for producing for each said first region in the first field or frame a first correlation surface representing said difference;

means for weighting the first correlation surfaces of a respective one of said first regions and of a plurality of first regions adjoining said respective first region, the first correlation surface of said respective first region having the greatest weighting to accentuate features of the first correlation surface of said respective first region relative to those of the adjoining first regions, all the points within a given correlation surface being Weighted equally, and for summing the weighted first correlation surfaces to generate a grown correlation surface; and means for deriving from each grown correlation surface a motion vector representing the motion of the content of said common block as a function of a minimum value within the grown correlation surface.

7. Apparatus as claimed in claim 6, wherein the means for weighting and summing comprises a digital filter.

* * * * *